(12) United States Patent
Storry et al.

(10) Patent No.: US 7,330,888 B2
(45) Date of Patent: Feb. 12, 2008

(54) PARTITIONED INTERFACE ARCHITECTURE FOR TRANSMISSION OF BROADBAND NETWORK TRAFFIC TO AND FROM AN ACCESS NETWORK

(75) Inventors: Charles Michael Storry, Kemptville (CA); Stephen Haldane Wellington, Ottawa (CA); Francis Frederick Budd, Kanata (CA)

(73) Assignee: Alcatel Canada Inc., Kanata, ON (CA)

( * ) Notice: Subject to any disclaimer, the term of this patent is extended or adjusted under 35 U.S.C. 154(b) by 866 days.

(21) Appl. No.: 10/349,962

(22) Filed: Jan. 24, 2003

(65) Prior Publication Data

US 2003/0221003 A1 Nov. 27, 2003

(30) Foreign Application Priority Data

May 24, 2002 (CA) .................................. 2387654

(51) Int. Cl.
G06F 15/173 (2006.01)

(52) U.S. Cl. ...................... 709/224; 370/252; 370/336; 370/410

(58) Field of Classification Search ................ 370/260, 370/395.53, 330, 252, 410, 532, 336; 709/249, 709/224; 375/222

See application file for complete search history.

(56) References Cited

U.S. PATENT DOCUMENTS 6,049,531 A * 4/2000 Roy ........................ 370/395.53

(Continued)

FOREIGN PATENT DOCUMENTS

EP 1113696 A 7/2001

(Continued)

OTHER PUBLICATIONS

Daley, Robert, Fujitsu—The Possibilities are Infinite—Subtending VDSL From Existing Service Platforms 2001-205, Jun. 21, 2001.

(Continued)

Primary Examiner—Jungwon Chang
(74) Attorney, Agent, or Firm—Marks & Clerk; Richard J. Mitchell

(57) ABSTRACT

There is a disclosed communications network for the transmission of network traffic from a distribution network to an access network having at least one end user terminal. The distribution network and the access network each having a respective traffic transmission capacity with the traffic transmission capacity of the distribution network being greater than the traffic transmission capacity of the access network. The communications network has a first network device operatively connected to the distribution network. The first network apparatus is capable of receiving network traffic from the distribution network. The communications network also has a second network device operatively connected to the access network. The second network device is capable of transmitting network traffic to the access network. The communications network also has a transmission link operatively connected between the first network device and the second network device. The first network device is capable of transmitting network traffic to the second network device over the transmission link. The transmission link has a traffic transmission capacity greater than the traffic transmission capacity of the access network.

19 Claims, 5 Drawing Sheets

U.S. PATENT DOCUMENTS

| | | | |
|---|---|---|---|
| 6,310,862 B1 * | 10/2001 | Roy | 370/260 |
| 6,650,628 B1 * | 11/2003 | Boch | 370/330 |
| 2002/0064221 A1 * | 5/2002 | Yeap et al. | 375/222 |
| 2002/0101826 A1 * | 8/2002 | Giacopelli et al. | 370/252 |
| 2002/0118707 A1 * | 8/2002 | Autere et al. | 370/532 |
| 2002/0152326 A1 * | 10/2002 | Orshan | 709/249 |
| 2002/0159467 A1 * | 10/2002 | Kirshenboim et al. | 370/410 |
| 2004/0213188 A1 * | 10/2004 | Struhsaker et al. | 370/336 |

FOREIGN PATENT DOCUMENTS

| | | |
|---|---|---|
| WO | WO 98/58489 | 12/1998 |
| WO | WO 02/10944 A | 2/2002 |
| WO | WO 02/14979 A | 2/2002 |
| WO | WO 02/35906 A | 5/2002 |

OTHER PUBLICATIONS

Daley, Robert, DSL Forum 2000-205—VDSL Evolution—Subtending VDSL from Existing Service Platforms—Fujitsu Telecommunications Europe Ltd. Birmingham Business Park, Birmingham UK B37 7YU, 2000.

Marconi, "Deep Fiber Solutions", Feb. 4, 2002.

MRV Communications, Inc. Company—"Fiber Driver" Feb. 4, 2002.

* cited by examiner

PARTITIONED INTERFACE ARCHITECTURE FOR TRANSMISSION OF BROADBAND NETWORK TRAFFIC TO AND FROM AN ACCESS NETWORK

FIELD OF THE INVENTION

The present invention relates generally to the field of communications networks and more particularly, to a network arrangement and associated network components for the transmission of network traffic to and from an access network.

By way of example, the present invention may suitably be deployed in the wireline transmission of broadband network traffic from a distribution backbone network such as a trunk network to an access network such as a local loop having one or more access terminals. In the given example, a remote network unit according to one embodiment of the present invention may be utilized to interface with the local loop located downstream of the distribution backbone network. A distribution network unit according to another embodiment of the present invention may be utilized to interface with the distribution backbone network. The remote network unit may be operatively connected to the distribution network unit by way of a high-capacity transmission link, for instance one supporting an aggregate data throughput of the order of 1 or 2 Gbps.

Where the transmission medium of the local loop is typically copper and that of the distribution backbone network is a higher capacity transmission medium such as optical fibre, the exemplary network architecture and associated network components of the present invention can advantageously be provisioned to result in an extension of the higher-capacity transmission medium of the distribution backbone network so that the latter is in closer physical proximity to the access terminals of the local loop. This may render the provisioning of higher bandwidth applications to network users more feasible than would otherwise be the case.

BACKGROUND OF THE INVENTION

It is said that whether in terms of distance covered, number of endpoints generated or value invested, the most predominant transmission medium for communications networks worldwide is that of copper. This has resulted from the use of copper as a transmission medium in the earliest of large scale telephony networks. Although copper has now largely been superseded in trunk or distribution networks by the use of optical fibre, many access networks, such as the local loops of public switched telephone networks, continue to employ copper. Globally, it is estimated that many tens of millions of tons of copper are deployed in such access networks and that this transmission medium may account for roughly one-half or more of the assets of the typical network operator.

As a transmission or delivery medium in modem communications networks, copper presents the challenge that it provides a theoretical maximum information rate of only approximately 35 kbps to 56 kbps across public switched telephone networks. Many technologies have emerged to extract higher bandwidth data transmissions from the existing copper based networks, due to a market demand for the delivery on such networks of higher bandwidth applications such as digital video and high-speed Internet access. For instance, a number of digital subscriber line or loop (DSL) architectures have been introduced in the last decade, each providing differing combinations of upstream data rates, downstream data rates and ranges of operation. Collectively, this family of digital subscriber line architectures is sometimes referred to as xDSL, and will be so referred to in this specification to denote all such digital subscriber line architecture.

The various xDSL architectures as introduced above cannot typically operate in ranges which exceed a few kilometers. For example, in high-speed digital subscriber loop (HDSL) technologies, data rates in the neighbourhood of 2 Mbps can be achieved by combining the capacity of two or three pairs. However, this is sustainable only over a distance of approximately 3 km. Using very high rate digital subscriber loop (VDSL) techniques, typical data rates of 23 Mbps in the downstream direction and 3 Mbps in the upstream direction can be attained, but only for distances in the neighbourhood of 1 kilometer at such rates.

Given the foregoing constraints, it has become necessary in the art to attempt to reduce the effective distance between a distribution backbone network and access terminals deployed within an access network, where the distribution backbone network employs a higher capacity transmission medium than that of the access network. In the illustrative case of a telephony access network consisting of a copper based local loop, the service provider central office is effectively brought in closer proximity to the end user subscriber by various means.

For instance, it is known in the art to employ scaled central office architectures, whereby a central office system is reduced in scale by reconfiguring an existing large scale switch to provide fewer user data ports. The scaled equipment is then deployed remotely from the central office and in closer proximity to the end user subscriber. This known solution suffers from a number of disadvantages. First, the scaled architecture employs the very same equipment infrastructure, such as control systems and power systems, as does the existing large scale equipment from which it is adapted. This tends to maintain the procurement cost and power requirements of the scaled equipment in a comparable range to that of the larger scale equipment. Second, the physical size of the scaled equipment is ordinarily the same as that of the large scale equipment, such that the known scaled architecture solutions typically do not offer an appreciable advantage as to physical size reduction. Thus, scaled architecture solutions as known in the art do not generally provide significant savings in respect of equipment procurement cost, operational power requirements or physical equipment size.

Another category of solutions in the prior art is that of repeatered architectures. Under such solutions, a subscriber line such as one provisioned for xDSL service is repeatered or carried via some other medium to thereafter be replicated at a remote location in closer proximity to the end user subscriber than is the central office equipment. This prior art category of solutions is disadvantageous in that it requires repeater equipment to be purchased, installed and maintained in addition to existing central office equipment.

Based on the foregoing prior art solutions, there is therefore a need for an alternate approach to the problem of reducing the effective distance between a distribution backbone network and access terminals deployed within an access network, where the distribution backbone network employs a higher capacity transmission medium than that of the access network.

Where the transmission medium of the local loop is typically copper and that of the distribution background network is a higher capacity transmission medium such as optical fibre, the exemplary network architecture and associated network components according to the present invention can advantageously be provisioned to result in an extension of the higher-capacity transmission medium of the distribution backbone network so that the latter is in closer physical proximity to the access terminals of the local loop. This may render the provisioning of higher bandwidth applications to network users more feasible than would otherwise be the case, while intending to alleviate some of the concerns and problems associated with the prior art solutions previously mentioned.

BRIEF DESCRIPTION OF THE DRAWINGS

By way of illustration and not of limitation, embodiments of the present invention are next described with reference to the following drawings, in which.

DETAILED DESCRIPTION OF ILLUSTRATIVE EMBODIMENTS

Figure 1:
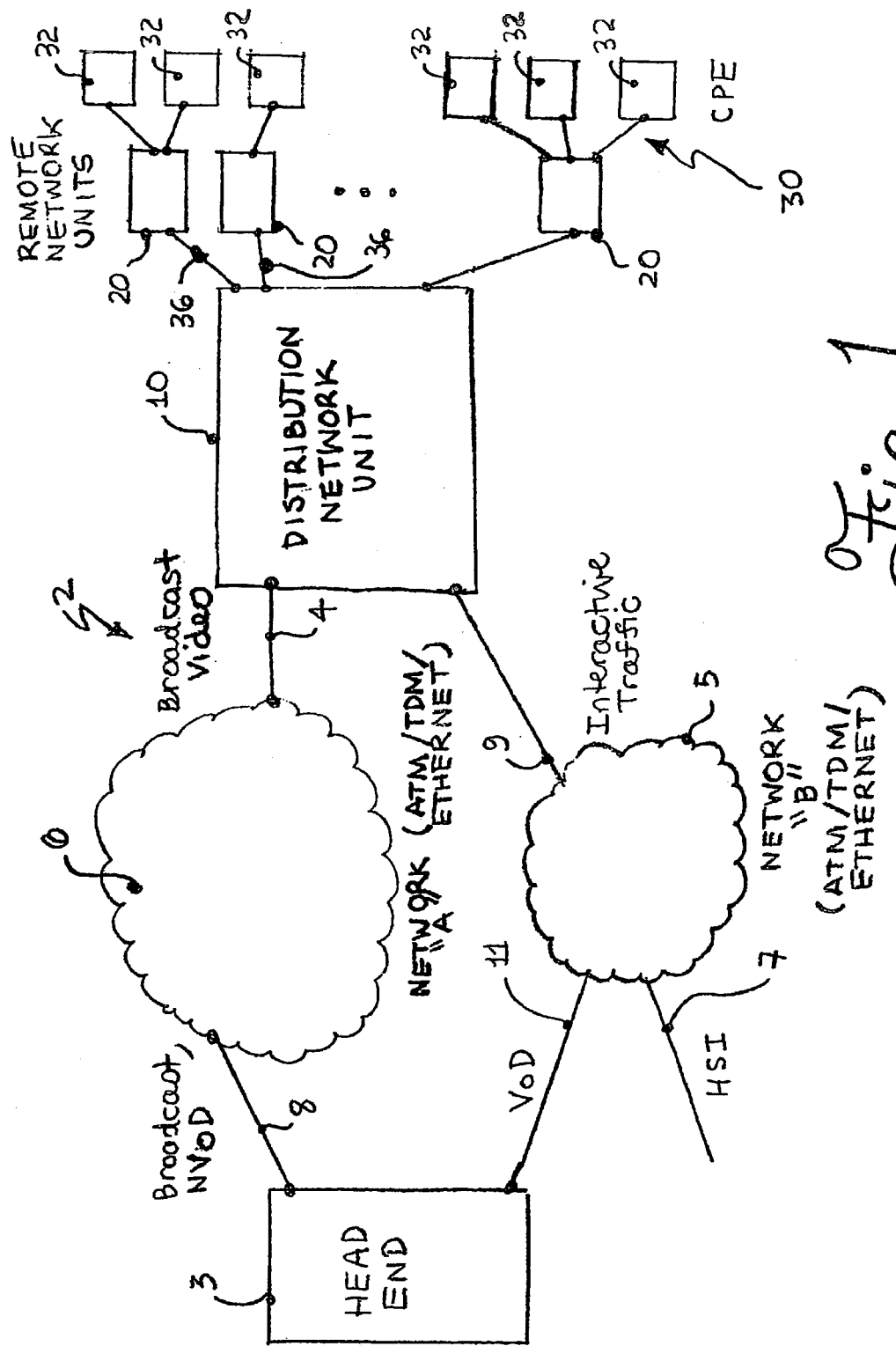
FIG. 1 is an exemplary network topology in which a distribution network unit and a remote network unit are deployed according to embodiments of the present invention.

An example of a network topology 2 comprising a distribution network and an access network in which a distribution network unit 10 and a corresponding remote network unit 20 are deployed according to an embodiment of the present invention is shown in FIG. 1. The network topology 2 may provide various forms of traffic destined for an access network via the distribution network unit 10, with such traffic having differing requirements as to bandwidth or class of transmission service. Broadcast video traffic 4 and interactive traffic 9 constitute the broadband network traffic and are provided to distribution network unit 10 via the distribution backbone network which includes the distribution networks 5 and 6 although networks 5 and 6 may be combined as will be obvious to those skilled in the art. For instance, broadcast video traffic may be delivered to the distribution network unit 10 by way of an OC-12 interface 4 or the like, from a suitable distribution network 6 (also labelled Network "A") such as one employing asynchronous transfer mode (ATM), time division multiplexing (TDM), Ethernet or other suitable communications protocols. Broadcast video traffic may comprise such services as those pertaining to broadcast TV or near video on demand (NVoD), as transmitted via link 8 from head end 3. Interactive traffic may also be delivered to the distribution network unit 10, for instance by way of an OC-3 interface 9 or the like from a distribution network 5 (also labelled Network "B") to which various forms of such traffic may initially be directed. For instance, from the head end 3 the distribution network 5 may receive traffic over link 11 which supports services in the nature of video on demand (VoD). The distribution network 5 may also receive high-speed Internet (HSI) traffic over link 7, for instance from a backbone network (not shown). Many other suitable network topologies will be apparent to those skilled in this art for the provision or delivery of traffic to or from an access network as aforesaid.

A plurality of remote network units 20, as described more fully below, may operatively be connected to the distribution network unit 10. Each remote network unit 20 is connected to an access network, such as the local copper loop 30. The local copper loop 30 itself connects to customer premises equipment which may be in the form of one or more user terminals 32. Each remote network unit 20 is connected to its corresponding distribution network unit 10 by means of a high-capacity transmission link 36, in other words one having a capacity greater than that associated with the access network. For instance, transmission link 36 may be an aggregate fibre link capable of supporting an aggregate data throughput of the order of 1 or 2 Gbps. Any other appropriate link as known to those in this art may be deployed as transmission link 36, for instance a wireless link, a link based on passive optical networking (PON) technology or the like.

Figure 2:
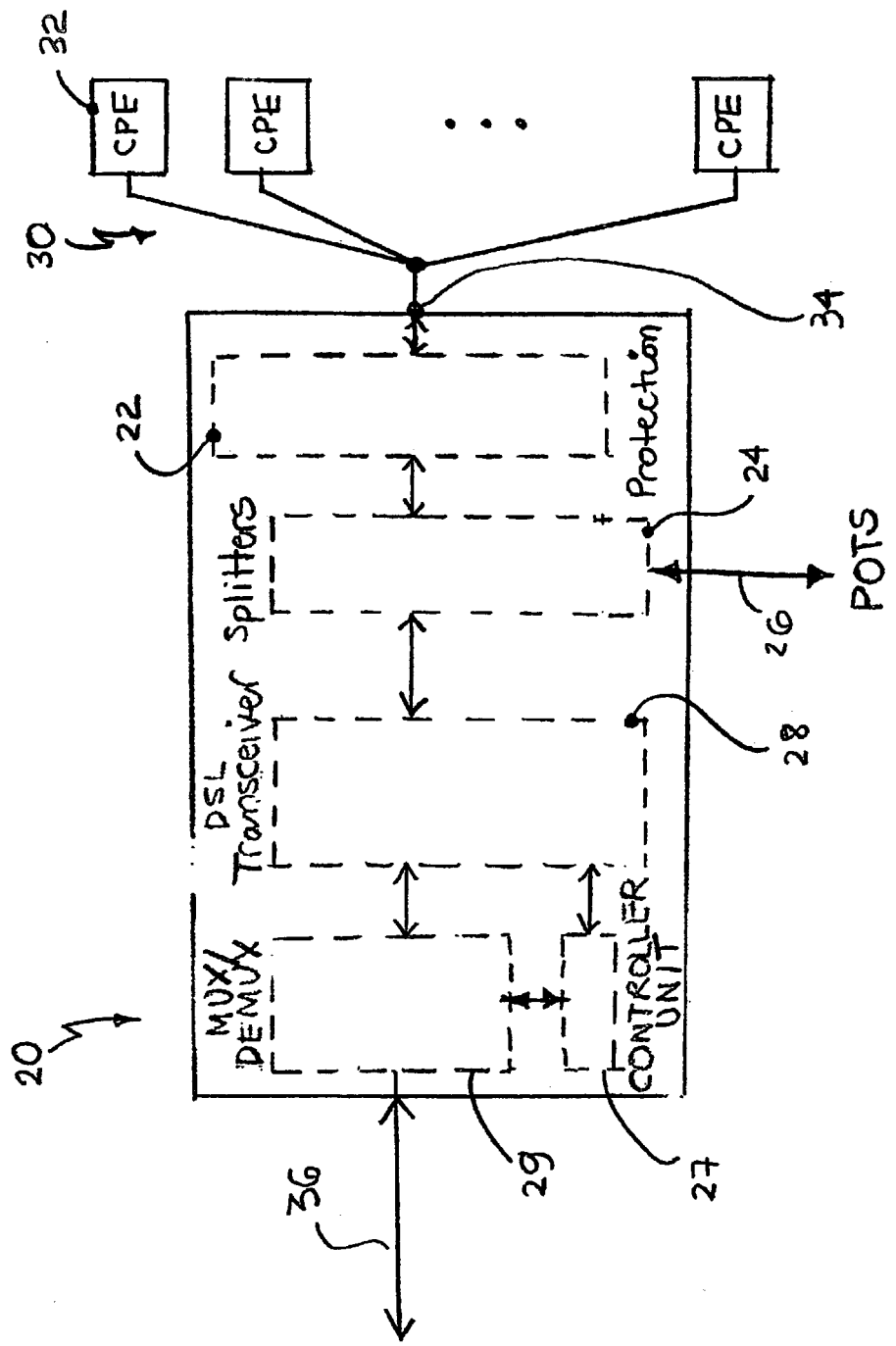
FIG. 2 is a block diagram depicting a high-level architecture of the remote network unit according to FIG. 1.

FIG. 2 depicts the block architecture of the remote network unit 20 according to an embodiment of the present invention. This block architecture is described immediately below, proceeding from the downstream terminal end of the access network to the upstream egress end of the remote network unit 20. However, those skilled in this art will appreciate that traffic flow in and through the remote network unit 20 is bidirectional in nature, insofar as interactive traffic is concerned.

The expression "downstream" is employed herein for ease of reference to refer to traffic flow that is generally bound in the direction from the distribution networks 5 and 6 towards the remote user terminals 32. Conversely, the expression "upstream" is employed herein to refer to traffic flow that is generally bound in the direction from the remote user terminals 32 towards the distribution networks 5 and 6. Furthermore, the expression "loop-side" is employed herein in connection with components or modules that are considered to be more proximate to the copper loop 30 when compared to the transmission link 36 located in the upstream direction thereto. Conversely, the expression "distribution-side" is employed herein in connection with components or modules that are considered to be less proximate to the copper loop 30 than the transmission link 36.

At the downstream terminal end of an access network, such as the local copper loop 30, are located customer premises equipment which may be in the form of one or more user terminals 32. The local copper loop 30 from each of the user terminals 32 is connected to the remote network unit 20, as at 34. Although for purposes of illustration a single connection 34 has been depicted in FIG. 2, those skilled in this art will appreciate that each CPE 32 typically will be connected independently to the remote network unit 20. Where the lines of the local copper loop 30 would require primary protection blocks 22 as are known in this art, these may be provisioned in the remote network unit 20. Depending on the line technology with which the remote network unit 20 is to be deployed, splitters 24 may also be provisioned therein. Where the access network such as local copper loop 30 supports plain old telephone service (POTS), the splitters 24 cause a separation of the conventional POTS telephone service traffic from data services traffic received thereover by remote network unit 20. The POTS telephone service traffic is channeled as at 26 to a corresponding POTS network without further processing by the remote network unit 20. Similarly, where an integrated services digital network (ISDN) is deployed in the access network, splitters 24 may likewise channel ISDN traffic to avoid further processing thereof by the remote network unit 20.

Data services traffic, for instance in the form of xDSL data, may proceed from the splitters 24 to a processing block which, in the case of xDSL data, is provisioned in the form of one or more xDSL transceivers 28 well known to the notional person skilled in the field of communications. Each xDSL transceiver 28 includes associated xDSL chipsets, line drivers and other external circuitry (not shown) required to implement the supported xDSL service, all as appreciated by those skilled in this art. By way of example, one or more xDSL transceivers 28 may support ninety-six (96) user data ports (not shown) such as ADSL ports running on POTS lines. Also as known to those versed in this art, each xDSL transceiver 28 will typically contain management interfaces (not shown) to provide configuration, alarm and statistics collection capabilities. Such management interfaces of each xDSL transceiver 28 may be controlled locally or remotely, for instance respectively by way of known in-band or out-of-band techniques. For in-band control, the DSL chipsets of an xDSL transceiver 28 are typically configured from a remote processor via direct addressing and without local processor intervention. In the case of out-of-band control, the aforesaid xDSL chipsets are usually configured using specific signaling between a remote processor and a local processor, resulting in control messages being directed to the xDSL chipset. The aforesaid management interfaces of each xDSL transceiver 28 may be accessed by means of a loop-side controller unit 27, which is described in greater detail below. Remote control of such transceivers may be provided by the distribution network unit 10 via appropriately generated messages transmitted over transmission link 36 to remote network unit 20.

Figure 3:
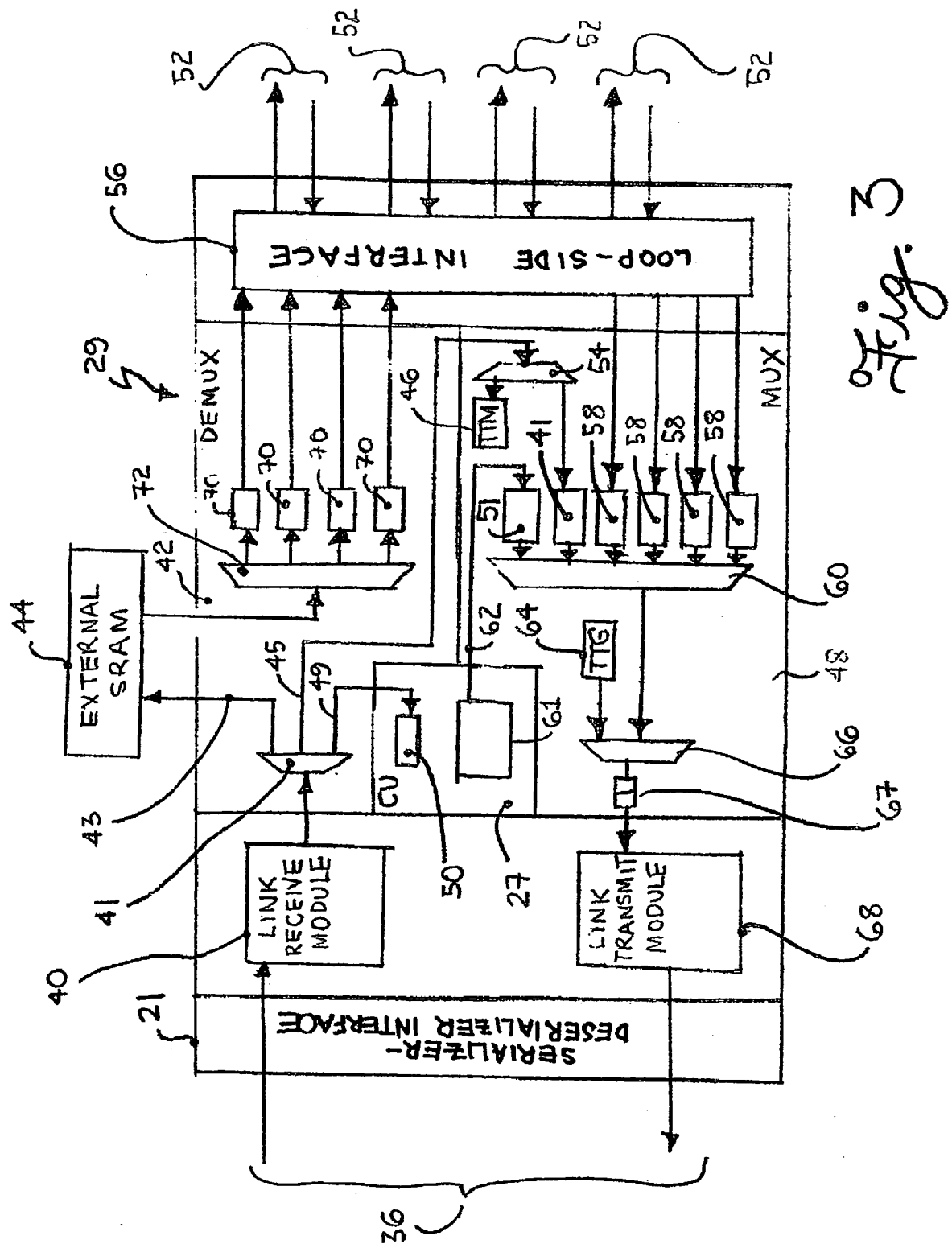
FIG. 3 is a block diagram illustrating architectural details of a loop-side multiplexer/demultiplexer unit and a loop-side controller unit according to embodiments of the present invention and forming part of the remote network unit of FIGS. 1 and 2.

Upstream from the xDSL transceivers 28, cells from individual xDSL ports are multiplexed in the loop-side multiplexer/demultiplexer unit 29, as explained in greater detail below. An appropriate link termination (not shown in FIG. 2), well known to those in this art, may be deployed between transmission link 36 and loop-side multiplexer/demultiplexer unit 29. An exemplary link termination is identified below as part of loop-side multiplexer/demultiplexer unit 29 (FIG. 3). The multiplexed cells are thereafter transmitted to the distribution network unit 10 via transmission link 36 as aforesaid. In the downstream direction, the loop-side multiplexer/demultiplexer unit 29 demultiplexes cells received over transmission link 36 from the distribution network unit 10. Such demultiplexed cells are thereafter transmitted to the xDSL transceivers 28 which, as described above, support individual xDSL ports.

According to an illustrative embodiment of the remote network unit 20, congestion or queuing points are not introduced into the traffic stream traversing therethrough, except for jitter buffering if desired. Rather, the aggregate capacity of transmission link 36 and the internal architecture of the remote network unit 20 are such that the full bandwidth capacity of all xDSL ports supported by xDSL transceivers 28 is met. Those skilled in the art will understand that the foregoing capacity considerations for transmission link 36 constitute a preferred implementation, such that the present invention may be provisioned with a downstream link capacity which may be less than that of the corresponding xDSL ports in question.

Architectural details of the loop-side multiplexer/demultiplexer unit 29 and the loop-side controller unit 27 are next described with reference to FIG. 3. The transmission link 36 may be connected from the distribution network unit 10 to the remote network unit 20 by means of a suitable interface for bidirectional data transfer, for instance a loop-side serializer-deserializer (SD) interface 21 such as the TLK1201 SERDES device commercially available from Texas Instruments Incorporated of Dallas, Tex., U.S.A., operatively coupled to a suitable optical interface module. Using this bidirectional interface configuration will preferably permit transmission link 36 to operate with 8B/10B encoded data at 1.25 Gbps in each direction between the distribution network unit 10 and the remote network unit 20. Those skilled in this art will appreciate that any other appropriate interface may be provisioned for use with the present invention, and that transmission link 36 may comprise a single bidirectional link or multiple unidirectional links as may be desired.

Cell data received as individual bytes in the downstream bound direction from the transmission link 36 and over the loop-side serializer-deserializer interface 21 of the remote network unit 20 is processed by a loop-side link receive module 40. Although traffic in the form of cell data which are received as individual bytes is what is being contemplated by the illustrative embodiment herein, those versed in the art will understand that the invention is likewise applicable to packets, frames or any other information transfer units and that bit-wise reception of traffic may also be accommodated by the present invention. The loop-side link receive module 40 performs any necessary frame alignment functions and reconstructs cells following frame alignment from the individual bytes received by the loop-side serializer-deserializer interface 21. A port identifier associated with the cell data is also extracted by loop-side link receive module 40 for purposes of downstream cell routing, as described more fully below. Subsequent to cell reconstruction, appropriate error control as known in this art is performed by the loop-side link receive module 40 and any cells which are received with errors or which are idle are discarded. Non-errored and non-idled cells are thereafter transferred from the loop-side link receive module 40 to a loop-side demultiplexer module 42, which manages downstream cell flow for the remote network unit 20. Preferably, the loop-side demultiplexer module 42 does not provide any back pressure indication to the loop-side serializer-deserializer interface 21. This requires the loop-side demultiplexer module 42 to be capable of accepting back-to-back cells transmitted at the full rate of the transmission link 36.

The loop-side demultiplexer module 42 routes received and reconstructed downstream cells that are transmitted from the loop-side link receive module 40. The cells are routed as at block 41 to one of a number of destinations, based on the port identifier extracted as previously described. For example, cells associated with a port identifier that may be used to characterize control cells are routed to the loop-side controller unit 27. Such control cells are preferably routed as at 49 to a control cell queue 50 associated with the loop-side controller unit 27. For instance, control cell queue 50 may be provisioned as first-in first-out (FIFO) registers. Where cells are associated with a port identifier which corresponds to a port identifier that may be used to characterize cells destined for monitoring or test purposes, such cells are routed as at 45 to a loop-side test traffic monitor 46 or the like, via block 54. The function of test traffic monitor 46 is described in additional detail below.

Downstream bound cells from loop-side link receive module 40 that are associated with a port identifier corresponding to user data cells may be written as at 43 respectively to one of a plurality of data cell queues 44, whereby each such queue in turn corresponds to an external user data port such as one of the previously mentioned ADSL ports of the remote network unit 20. The data cell queues 44 may be provisioned as first-in first-out (FIFO) registers in an external SRAM or the like. Cells are thereafter transferred from their respective data cell queues 44 to outgoing loop-side queues 70 via block 72. The outgoing loop-side queues 70 may be provisioned as first-in first-out (FIFO) registers. From such outgoing loop-side queues 70, the cells are forwarded to a suitable loop-side interface 56 such as one conforming to the UTOPIA (Universal Test & Operations PHY Interface for ATM) Level 2 Physical Layer Interface as known to those in this art and as described in ATM Forum Technical Committee publication af-phy-0039.000, version 1.0, dated June 1995. The latter publication is incorporated by reference herein.

In the downstream direction, the loop-side interface 56 transmits cells from the loop-side demultiplexer module 42 to the DSL transceivers 28. In the illustrative embodiment described above whereby the remote network unit 20 supports ninety-six (96) ADSL ports, such downstream cells may be transferred from the loop-side demultiplexer module 42 to DSL transceivers 28 via a loop-side interface 56 comprising four (4) bidirectional UTOPIA Level 2 compliant ports 52. Preferably, the outgoing loop-side queues 70 correspond in number to the number of ports 52 provided with the loop-side interface 56, such that in the example mentioned above, twenty-four (24) ADSL ports will be assigned to each of four (4) outgoing loop-side queues 70.

The cells from each of the data cell queues 44 of the loop-side demultiplexer module 42 may be serviced in the downstream direction for transfer to a corresponding outgoing loop-side queue 70 using a suitable servicing scheme such as one based on a work conserving round robin algorithm, as known to those in this art. The loop-side demultiplexer module 42 also preferably serves to poll each external user data port of the remote network unit 20, such as the previously mentioned ADSL ports. The results of such polling by the remote network unit 20 are utilized to indicate a back pressure condition for each external user data port, as understood by those persons skilled in this art. For instance, a back pressure indication for a particular external user data port may be lifted where a cell destined for that same port has been transferred from an appropriate outgoing loop-side queue 70 to the loop-side interface 56. Likewise and by way of example, a back pressure indication for a particular external user data port may be activated upon selection of that same port for cell transfer from the associated data cell queue 44 to the appropriate outgoing loop-side queue 70. Where a particular external user data port is under a back pressure condition, the associated data cell queue 44 for that same port will not be serviced as aforesaid for transfer to a corresponding outgoing loop-side queue 70.

The loop-side multiplexer/demultiplexer unit 29 may also serve to manage loop-back traffic, as explained immediately below. Where a particular user data port is selected for loopback into the upstream bound traffic flow, then cells whose associated port identifier corresponds to the selected user data port will be routed as at 45 from the loop-side demultiplexer module 42 to the loop-side multiplexer module 48 for transmission in the upstream direction. The loopback cells in question may be received in a loopback cell queue 41 via block 54, and the loopback cell queue 41 may be provisioned as first-in first-out (FIFO) registers associated with the loop-side multiplexer module 48. Such loopback cells preferably do not receive data cell queues 44 as previously described. All other cells having port identifiers not as previously described may be dropped by the loop-side demultiplexer module 42 from the downstream bound traffic flow.

Upstream bound cells transmitted to the loop-side multiplexer/demultiplexer unit 29 from the DSL transceivers 28 may be received over loop-side interface 56. The upstream bound cells from loop-side interface 56 are forwarded to loop-side multiplexer module 48, which manages upstream cell flow for the remote network unit 20. The loop-side multiplexer module 48 polls the four (4) UTOPIA Level 2 compliant ports 52 mentioned above and may select from among these a particular port 52 pursuant to a desired cell servicing scheme, for instance one based upon a work-conservative binary round robin algorithm as known to those skilled in this art. Cells are transferred in this manner from each of the UTOPIA Level 2 compliant ports 52 to respective outgoing upstream queues 58, which may be provisioned as independent first-in first-out (FIFO) registers associated with the loop-side multiplexer module 48 and which are one-to-one mapped with the UTOPIA Level 2 compliant ports 52. The outgoing upstream queues 58 preferably provide backpressure information for purposes of polling as aforesaid of the ports 52.

Each of the outgoing loop-side queues 58 is itself serviced as at servicing block 60 together with loopback cell queue 41, previously described, and a loop-side control cell queue 51. The loop-side control cell queue 51 may for instance receive AAL5 control cells transmitted as at 62 from a cell generator 61 of the loop-side controller unit 27. Servicing block 60 preferably implements a work-conservative weighted round robin algorithm for selecting the particular upstream queue that is next to be serviced, whether one of the outgoing upstream queues 58, the loopback cell queue 41 or the control cell queue 51.

The loop-side multiplexer module 48 preferably comprises a loop-side test traffic generator 64 for upstream transmission of test cells. Where the loop-side test traffic generator 64 is deployed, an associated servicing block 66 can be utilized to implement a desired servicing scheme for the selection of cells proceeding from test traffic generator 64 and from servicing block 60, the latter being located upstream of servicing block 66 and more proximate to loop-side interface 56. The servicing scheme implemented by servicing block 66 is preferably one based on a work-conservative weighted round robin algorithm, as known to those in this art. As well, where a loop-side test traffic generator 64 is to form part of loop-side multiplexer module 48, servicing block 60 is preferably back-pressured whenever the test traffic generator 64 is enabled, so as to permit the insertion of upstream test traffic from loop-side test traffic generator 64 at a desired rate.

Cells proceeding from servicing block 66 of the loop-side multiplexer module 48 are transferred to a loop-side link transmit module 68, preferably via a loop-side multiplexer output queue 67 which may be provisioned as first-in first-out (FIFO) registers. The loop-side link transmit module 68 performs header error control (HEC) checking and slot error control (SEC) insertion. As well, the downstream link transmit module 68 generates an appropriate cell framing pattern and transmits data and idle cells to downstream serializer-deserializer interface 21 for transport onto transmission link 36.

As previously introduced, a loop-side test traffic monitor 46 preferably forms part of loop-side multiplexer module 48. When enabled, the loop-side test traffic monitor 46 functions to supervise any background test traffic. The monitored background test traffic is terminated at the loop-side test traffic monitor 46 and is not forwarded by the loop-side multiplexer module 48 in the direction of outgoing upstream queues 58. Preferably the loop-side test traffic monitor 46 does not provide back pressure indication to the loop-side demultiplexer module 42 from which test traffic cells are received.

The loop-side multiplexer/demultiplexer unit 29 and loop-side controller unit 27 of the remote network unit 20 as previously described may together be implemented by means of a field programmable gate array or other suitable device such as an ASIC as known to those in this field of art.

Figure 4:
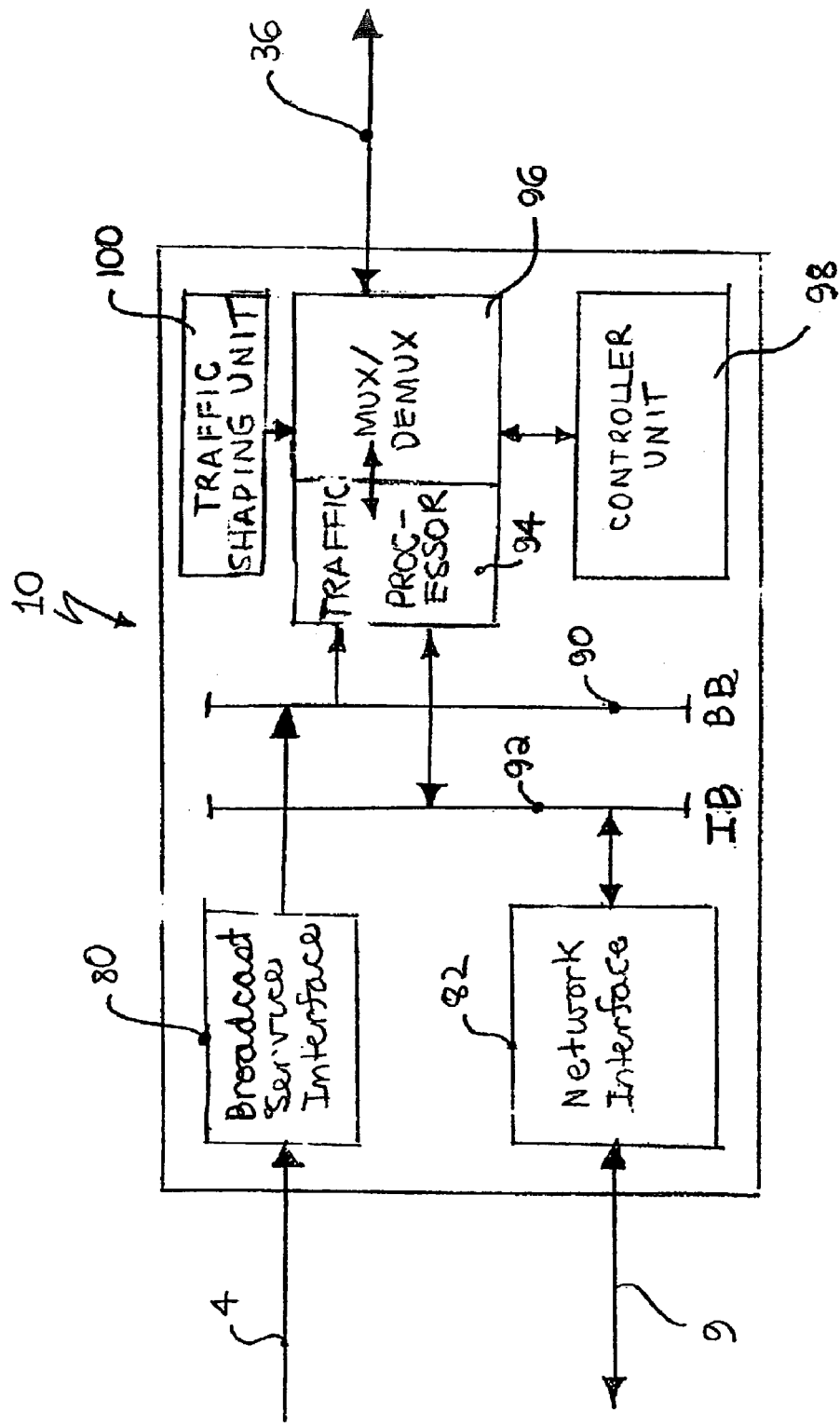
FIG. 4 is a block diagram depicting a high-level architecture of the distribution network unit according to FIG. 1.

With reference to FIG. 4, the block architecture of the distribution network unit 10 according to an embodiment of the present invention is next described. This block architecture is described immediately below, proceeding from the upstream interfaces 4 and 9 for the respective delivery of broadcast traffic and interactive traffic, as previously described, and from those interfaces downstream to the transmission interface 36. However, those skilled in this art will appreciate that traffic flow in and through the distribution network unit 20 is bidirectional in nature, insofar as interactive traffic is concerned.

Broadcast traffic transmitted over link 4 may be received by the distribution network unit 10 via a suitable broadcast service interface 80. The broadcast service interface 80 thus receives the broadcast traffic and forwards same to a broadcast bus (BB) 90 or the like. Interactive traffic transmitted over link 9 may be received and transmitted by the distribution network unit 10 via a suitable network interface 82 as known to persons skilled in this art. In the downstream bound direction, the network interface 82 thus receives the interactive traffic over link 9 and forwards same to an interactive bus (IB) 92 or the like.

A traffic processor 94 may be utilized to merge traffic received in the downstream bound direction from each of the broadcast bus 90 and the interactive bus 92. For the illustrative embodiment of FIG. 1 where the distribution network unit 10 receives ATM traffic in the case of link 4 and both transmits and receives ATM traffic in the case of link 9, the traffic processor 94 will also perform ATM cell processing. For instance, and as understood by those skilled in this art, the traffic processor 94 will queue ATM cells received from the buses 90, 92. Such queuing is preferably performed on a per quality of service class basis and on a per user data port basis. In the case of the illustrative embodiment of FIG. 1, the user data ports may be ADSL ports as previously described. In the context of ATM traffic, the traffic processor 94 performs traffic scheduling according to quality of service and traffic contract considerations, as is well known to persons versed in this art. Header translation and VPI/VCI mapping, also as known to those in this art, are preferably performed by the traffic processor 94 in the case of ATM traffic, together with support for operation, administration and management (OAM) functions likewise well known to those skilled in the art. For multicast ATM traffic, the traffic processor 94 may additionally perform known cell replication functions. Preferably, the throughput capacity of the traffic processor 94 will be such that the latter will not constitute a congestion point within the distribution network unit 10 in view of the aggregate transfer rate supported by the transmission link 36.

Those skilled in this art will understand that the distribution network unit 10 may deploy more (not shown) than one traffic processor 94, for instance where the user data port handling capacity of a single such traffic processor 94 is exceeded by the aggregate number of user data ports being supported by the remote network unit 20. For instance, if in a particular implementation the traffic processor 94 is capable of handling twelve (12) user data ports, such as the previously mentioned ADSL ports of the illustrative embodiment of FIG. 1, then a total (not shown) of eight (8) traffic processors 94 will be deployed in the distribution network unit 10 to handle the aggregate number of ninety-six (96) ADSL ports of the remote network unit 20 according to the illustrative embodiment. Each traffic processor 94 may be provisioned in the form of an application-specific integrated circuit (ASIC) or the like (not shown).

The traffic processor 94 of distribution network unit 10 preferably interfaces with a distribution-side multiplexer/demultiplexer unit 96. A suitable distribution-side interface 124 (FIG. 5) such as a Utopia Level 2 compliant interface or the like, as previously introduced in the context of the remote network unit 20, may be employed to transmit cells between the traffic processor 94 and the distribution-side multiplexer/demultiplexer unit 96. As explained in greater detail below, the distribution-side multiplexer/demultiplexer unit 96 performs the tasks of receiving the merged traffic from the traffic processor 94 and of demultiplexing interactive traffic received over transmission link 36 for upstream bound transmission to the traffic processor 94.

A distribution-side controller unit 98, described additionally below, may be utilized in the network distribution unit 10 to handle such tasks as online and offline test support, monitoring and processing of maintenance messages and communication with the remote network unit 20 via the distribution-side multiplexer/demultiplexer unit 96 and the transmission link 36. As described in greater detail below, a traffic shaping unit 100 performs traffic scheduling in respect of the downstream bound cell flow from the distribution-side multiplexer/demultiplexer unit 96 over transmission link 36.

Figure 5:
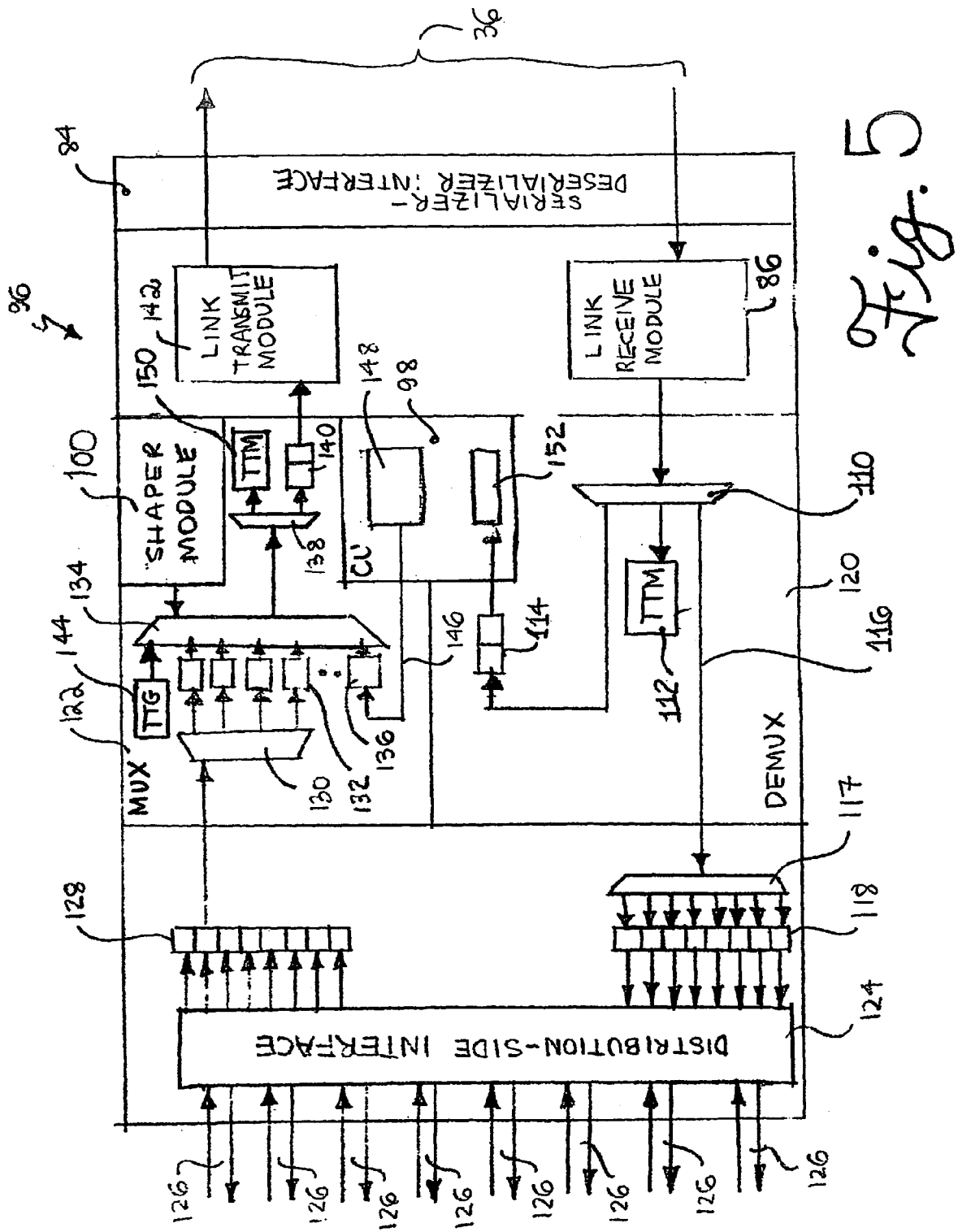
FIG. 5 is a block diagram illustrating architectural details of a distribution-side multiplexer/demultiplexer unit, distribution-side controller unit and traffic shaping unit according to embodiments of the present invention and forming part of the distribution network unit of FIGS. 1 and 4.

Architectural details of the distribution-side cell multiplexer/demultiplexer unit 96, the distribution-side controller unit 98 and the traffic shaping unit 100 are next described with reference to FIG. 5. The transmission link 36 from the remote network unit 20 may be connected to the distribution network unit 10 by means of a suitable interface for bidirectional data transfer. As explained above in relation to loop-side serializer-deserializer interface 21 of remote network unit 20, a distribution-side serializer-deserializer (SD) interface 84 such as the already-described TLK1201 SERDES device, operatively coupled to a suitable optical interface module, may be used to connect the distribution network unit 10 with the remote network unit 20. The distribution-side serializer-deserializer interface 84 of the distribution network unit 10 performs the very same functions as previously described in the context of loop-side serializer-deserializer interface 21 of the remote network unit 20. As mentioned previously in relation to loop-side serializer-deserialized interface 21, other suitable devices for the distribution-side serializer-deserializer interface 84 will be known to those in this art.

Cell data received as individual bytes in the upstream bound direction from the transmission link 36 and over the distribution-side serializer-deserializer interface 84 of the distribution network unit 10 is processed by a distribution-side link receive module 86. The distribution-side link receive module 86 performs the same functions as the counterpart loop-side link receive module 40 described above in relation to the remote network unit 20. A port identifier associated with the cell data is also extracted by the distribution-side link receive module 86 for purposes of upstream cell routing, as described more fully below. As is the case with the loop-side link receive module 40 which was previously described, non-errored and non-idled cells are thereafter transferred from the distribution-side link receive module 86 for further processing. These non-errored and non-idled cells are forwarded to a distribution-side demultiplexer module 120, which manages upstream cell flow for the distribution network unit 10. Preferably, the distribution-side demultiplexer module 120 does not provide any back pressure indication to the distribution-side serializer-deserializer interface 84. This requires the distribution-side demultiplexer module 120 to be capable of accepting back-to-back cells transmitted at the full rate of the transmission link 36.

The distribution-side demultiplexer module 120 routes received and reconstructed downstream cells that are transmitted from the distribution-side link receive module 86. The cells are routed as at block 110 to one of a number of destinations, based on the port identifier extracted as previously described. Where the port identifier of a cell is indicative of test traffic, the cell is routed via block 110 to a first distribution-side test traffic monitor (TTM) 112. When enabled, the distribution-side test traffic monitor 112 performs supervision of any background test cells received in the upstream bound direction from the remote network unit 20 over transmission link 36. The monitored background test traffic is terminated at the distribution-side test traffic monitor 112 and is not forwarded by the distribution-side demultiplexer module 120 in the direction of outgoing distribution-side queues 118.

Should the port identifier in question be indicative of a control cell, the cell is routed by the distribution-side demultiplexer module 120 via block 110 to a distribution-side control cell queue 114, which may be implemented as first-in first-out (FIFO) registers. Where the distribution-side control cell queue 114 overflows, the control cell being directed thereto will be dropped and an overflow indication may be provided by the distribution-side demultiplexer module 120 to the distribution-side controller unit 98. The distribution-side control cell queue 114 in turn supplies control cells to a control cell receiving unit 152 of distribution-side controller unit 98 which for instance performs AAL5 functions as well known to those in this art.

If a port identifier is indicative of a user data cell, the cell in question is routed by the distribution-side demultiplexer module 120 in the upstream bound direction as at 116 to an outgoing distribution-side queue 118 via block 117. Where more (not shown) than one traffic processor 94 is deployed as described above, a plurality of corresponding outgoing distribution-side queues 118 may be provisioned, each of the outgoing distribution-side queues 118 being dedicated to a given traffic processor 94. In the example introduced above where eight (8) traffic processors 94 are utilized in the distribution network unit 10 to handle traffic in respect of ninety-six (96) ADSL ports of the remote network unit 20, eight (8) corresponding outgoing distribution-side queues 118 may be provided in the distribution network unit 10. Where any outgoing distribution-side queue 118 overflows, the cell in question is dropped and an indication of same is provided to the distribution-side controller unit 98. From the outgoing distribution-side queues 118, user data cell traffic is next directed in the upstream bound direction to the distribution-side interface 124. From there the user data cell traffic is directed to a corresponding traffic processor 94 via a respective bidirectional link 126 which, in the illustrative embodiment, is Utopia Level 2 compliant.

Cells received from the distribution-side link receive module 86, and not having a port identifier falling within one of the categories of test traffic cells, user data cells or control cells as described above, are dropped from the distribution-side demultiplexer module 120. An indication of same may then be provided to the distribution-side controller unit 98.

In the downstream bound direction, cell traffic received by the distribution-side multiplexer/demultiplexer unit 96 over the bidirectional links 126 are transmitted via distribution-side interface 124 to incoming distribution-side queues 128. The incoming distribution-side queues 128 may be provisioned as first-in first-out (FIFO) registers, with a queue corresponding to each of the bidirectional links 126. The queued cells from the incoming downstream queues 128 are forwarded via block 130 of the distribution-side multiplexer module 122 to one of a plurality of outgoing distribution-side queues 132. The outgoing distribution-side queues 132 may also be provisioned as first-in first-out (FIFO) registers, with each one of the outgoing distribution-side queues 132 corresponding to an external user data port of the remote network unit 20. Thus, in the example introduced above where the remote network unit 20 is provisioned with ninety-six (96) ADSL ports, a corresponding plurality of outgoing distribution-side queues 132 will be provided in the distribution network unit with a one-to-one mapping to each such port.

Servicing block 134 of the distribution-side multiplexer module 122 is located downstream of the outgoing distribution-side queues 132. The servicing block 134 forwards cells to block 138 from each of the outgoing distribution-side queues 132, from a distribution-side test traffic generator (TTG) 144 and from a distribution-side control cell queue 136. The distribution-side test traffic generator 144 is for downstream transmission of test cells. The downstream control cell queue 136 may for instance receive AAL5 control cells transmitted as at 146 from a cell generator 148 of the distribution-side controller unit 98. At block 138, user data cells, test cells and control cells that have been transmitted by servicing block 134 as mentioned above are forwarded to a distribution-side output queue 140 for subsequent downstream forwarding onto transmission 36 via a distribution-side link transmit module 142. The distribution-side output queue 140 may be provisioned as first-in first-out (FIFO) registers. The distribution-side link transmit module 142 of the distribution network unit 10 performs the same functions as the counterpart loop-side link transmit module 68 of the remote network unit 20. The scheduling scheme for servicing block 134 is applied by traffic shaping unit 100, as described in greater detail below.

A second distribution-side test traffic monitor (TTM) 150 may be used to validate test traffic received by the distribution-side multiplexer module 122 from the traffic processors 94 over the distribution-side interface 124. When enabled, the second distribution-side test traffic monitor 150 functions to supervise any background test traffic via block 138. The monitored background test traffic is terminated at the second distribution-side test traffic monitor 150 and is not forwarded by the distribution-side multiplexer module 122 in the direction of distribution-side output queue 140.

As introduced above, the traffic shaping unit 100 performs traffic scheduling in respect of the downstream bound cell flow from the distribution-side multiplexer module 122 over transmission link 36. For instance, the traffic shaping unit 100 may be provisioned to schedule traffic for each of the user data ports of the remote network unit 20, for the distribution-side control cell queue 136 and for the distribution-side test traffic generator 144. By way of example, the traffic shaping unit 100 may ensure that the rate of the downstream user cell data traffic, on a per user data port basis, does not exceed the trained rate of the corresponding user data ports of the remote network unit 20. The traffic shaping unit 100 may also perform a suitable scheduling scheme in respect of the outgoing distribution-side queues 132, for instance one based on a work-conserving round robin algorithm or the like as known to those versed in this art. Preferably, the traffic shaping unit 100 may be programmable so as to accommodate predetermined or selectable scheduling schemes for the downstream bound cell flow.

The distribution-side multiplexer/demultiplexer unit 29 (FIG. 2), distribution-side controller unit 27 (FIG. 2) and traffic shaping unit 100 (FIG. 4) of the distribution network unit 10 as previously described may together be implemented by means of a field programmable gate array or other suitable device as known to those in this field of art.

The foregoing network topology and associated network components according to the present invention results in a partitioned interface architecture for transmission of broadband network traffic to and from an access network. Where central office equipment is concerned, the partitioned interface architecture promotes the avoidance of duplicative functions and may result in a potential reduction of unnecessary equipment overhead associated with the scaled or repeatered remote port architectures of the prior art. For instance, all common management, control, ATM switching, service processors and service interfaces may be envisaged to remain with the distribution network unit of the present invention as opposed to the remote network unit thereof. Likewise, any processing at the level of line ports may also be managed by the distribution network unit. This could include datapath functions such as ATM processing, egress quality of service queuing, OAM processing, traffic management, control processing, DSL mib implementation and transceiver control. Any required data and control interfaces may themselves be remoted from the distribution network unit to the remote network unit of the present invention across the transmission link therebetween. The remote network unit according to the present invention contains all necessary line interface circuitry, DSL transceivers and analogue front end circuitry. Moreover the remote network unit may be focussed in its operations to the multiplexing and demultiplexing of control data which proceeds to and from the previously mentioned loop-side controller unit and of user data which proceeds to and from the aforesaid DSL transceivers.

The embodiments of the invention in which an exclusive property or privilege is claimed are defined as follows:

1. A communications network arrangement for transporting traffic between a distribution network and end user terminals, the communications network arrangement comprising:
   (a) a central office distribution network unit operatively connected to the distribution network for sending and receiving network traffic to and from the distribution network, said central office distribution network unit including:
      (i) a traffic processor configured to process received network traffic and perform traffic management functions including traffic scheduling according to quality of service and traffic contract considerations and provide processed user traffic streams associated with said respective end user terminals and carrying corresponding identifiers;
      (ii) a first control unit for generating control messages;
      (iii) a multiplexer/demultiplexer for multiplexing the processed traffic received from the distribution network and the control messages into a multiplexed output traffic stream and demultiplexing multiplexed traffic received from the end user terminals into separate traffic streams;
   (b) at least one remote network unit, the or each remote network unit including:
      (i) a multiplexer/demultiplexer for multiplexing traffic streams received from the end user terminals and demultiplexing the multiplexed traffic stream received from the central office distribution network unit into separate user traffic streams destined for said respective end user terminals in accordance with said identifiers and a control traffic stream;
      (ii) transceivers for sending said separate user traffic streams to said end user terminals over local loops in accordance with their corresponding identifier and receiving traffic streams from said end user terminals destined for said distribution network;
      (iii) a second control unit controlling operation of said transceivers in response to control messages received from said central office network distribution unit; and
      (iv) said multiplexer/demultiplexer routing said control traffic stream to said second control unit; and
   (c) a transmission link operatively connected between the central office distribution network unit and said at least one remote network unit for carrying traffic between the central office distribution network unit and said remote network unit as a multiplexed stream of transfer units selected from the group consisting of cells, packets and frames, said transmission link having a higher bandwidth capacity than said local loops.

2. The communications network arrangement as recited in claim 1, wherein the traffic management functions include the performance of a predetermined traffic management scheme for the network traffic on a per-user basis.

3. The communications network arrangement as recited in claim 2, wherein the transmission link has a transmission capacity of at least about 1 Gbps.

4. The communications network arrangement as recited in claim 1, wherein said transfer units are deconstructed prior to transmission over the transmission link and reconstructed thereafter.

5. The communications network arrangement as recited in claim 1, wherein the traffic management function further comprises ATM processing, egress quality of service queuing, OAM processing, traffic management, control processing, DSL mib (management information base) implementation and DSL transceiver control.

6. A communications network arrangement for transporting traffic between a distribution network and end user terminals, the communications network arrangement comprising:
   (a) a central office distribution network unit operatively connected to the distribution network for sending and receiving network traffic to and from the distribution network, said central office distribution network unit including:
      (i) a traffic processor configured to process received network traffic to perform traffic management functions including traffic scheduling according to quality of service and traffic contract considerations and provide processed user traffic streams associated with said respective end user terminals and carrying corresponding identifiers;
(ii) a first control unit for generating control messages;
(iii) a multiplexer/demultiplexer for multiplexing the processed traffic received from the distribution network and the control messages into a multiplexed output traffic stream and demultiplexing multiplexed traffic received from the end user terminals into separate traffic streams
(b) at least one remote network unit, the or each remote network unit including:
(i) a multiplexer/demultiplexer for multiplexing traffic streams received from the end user terminals and demultiplexing the multiplexed traffic stream received from the central office distribution network unit into separate user traffic streams destined for said respective end user terminals in accordance with said identifiers and a control traffic stream;
(ii) transceivers for sending said separate traffic streams to said end user terminals over local loops in accordance with their corresponding identifier and receiving traffic streams from said end user terminals destined for said distribution network;
(iii) a second control unit controlling operation of said transceivers in response to control messages received from said central office network distribution unit; and
(iv) said multiplexer/demultiplexer routing said control traffic stream to said second control unit; and
(c) a transmission link operatively connected between the central office distribution network unit and said at least one remote network unit for carrying traffic between the central office distribution network unit and said remote network unit as a multiplexed stream of transfer units selected from the group consisting of cells, packets, and frames, said transmission link having a higher bandwidth capacity than said local loops;
wherein the network traffic is comprised of information transfer units which are deconstructed prior to transmission over the transmission link and reconstructed thereafter;
wherein the traffic management function further comprises ATM processing, egress quality of service queuing, OAM processing, traffic management, control processing, DSL mib (management information base) implementation and DSL transceiver control.

7. The communications network arrangement as recited in claim 6, wherein the information transfer units are ATM cells.

8. The communications network arrangement as recited in claim 7, wherein the end user terminals are xDSL service terminals.

9. The communications network arrangement as recited in claim 8, wherein the remote network unit comprises an xDSL transceiver corresponding to each xDSL service terminal.

10. The communications network arrangement as recited in claim 9, wherein the transmission link is a physical link.

11. The communications network arrangement as recited in claim 10, wherein the physical link comprises an optical fibre link.

12. The communications network arrangement as recited in claim 11, wherein the optical fiber link has a transmission capacity of at least about 1 Gbps.

13. The communications network as recited in claim 12, wherein the local loops are local copper wire telephone loops.

14. An interface for carrying broadband network traffic between a distribution network and end user terminals, comprising:
a central office unit connected to the distribution network and preparing traffic streams for transmission to end user terminals and receiving traffic streams from said end user terminals, said central office unit including a traffic processor performing traffic management functions and a multiplexer/demultiplexer for multiplexing the processed traffic received from the distribution network into a multiplexed output traffic stream of transfer units selected from the group consisting of cells, packets and frames, and demultiplexing multiplexed traffic received from the end user terminals, and a control unit generating control messages for controlling transceivers in said at least one remote network unit, and wherein said control messages are multiplexed in said multiplexed output traffic stream for transmission over said transmission link to said at least one remote control unit;
at least one remote access unit connected over respective local loops to at least two end user terminals, said remote access units including said transceivers for sending traffic to and receiving traffic from said end user terminals, a multiplexer/demultiplexer for multiplexing traffic streams received from the end user terminals and demultiplexing the multiplexed traffic stream received from the distribution network unit into separate user traffic streams destined for said respective end user terminals and a control stream, and a control unit control unit controlling operation of said transceivers in response to control messages received in said control stream; and
a transmission link having a bandwidth capacity greater than said local loops for carrying said multiplexed traffic between the central office unit and the remote access units as a multiplexed stream of said transfer units.

15. The interface of claim 14, wherein the broadband traffic received from the network is in the form of cells or packets and said central office unit places the received cells or packets in queues corresponding to the respective destination end user terminals.

16. The interface of claim 14, wherein the broadband traffic from the network is received in the form of ATM cells.

17. The interface of claim 16, wherein the traffic processor at the central office performs traffic scheduling according to quality of service requirements, header translation, and operation, administration and management (OAM) functions, leaving the at least one remote network unit to perform essentially only multiplexing/demultiplexing and forwarding functions.

18. The interface of claim 14, wherein said transceivers are xDSL transceivers.

19. The interface of claim 14, wherein the local loops are copper wire loops and said transmission link is an optical fiber link.

* * * * *